United States Patent
Lin

(10) Patent No.: US 7,065,896 B1
(45) Date of Patent: Jun. 27, 2006

(54) TAPE MEASURE WITH TAPE BRAKING MECHANISM

(75) Inventor: Ping-Lin Lin, Sanchung (TW)

(73) Assignee: Top-Long Industrial Co., Ltd., Sanchung (TW)

( * ) Notice: Subject to any disclaimer, the term of this patent is extended or adjusted under 35 U.S.C. 154(b) by 0 days.

(21) Appl. No.: 11/034,766

(22) Filed: Jan. 14, 2005

(51) Int. Cl.
  *G01B 3/10* (2006.01)
(52) U.S. Cl. ....................................................... 33/767
(58) Field of Classification Search ................. 33/767
  See application file for complete search history.

(56) References Cited

U.S. PATENT DOCUMENTS

| | | | |
|---|---|---|---|
| 4,131,244 A | * 12/1978 | Quenot | 33/767 |
| 5,448,837 A | * 9/1995 | Han-Teng | 33/761 |
| 5,471,761 A | * 12/1995 | Cheng | 33/761 |
| 6,491,248 B1 | * 12/2002 | Liu | 33/767 |
| 2004/0035017 A1 | * 2/2004 | Yang | 33/767 |

* cited by examiner

Primary Examiner—Christopher W. Fulton

(57) ABSTRACT

A tape measure includes an enclosure including an upper unit and a lower unit each defining a notch communicating with each other. The upper unit forms a protrusion. Poles are respectively formed on the upper unit and the lower unit adjacent the notches. The upper unit forms a pair of latches on opposite sides of the notch. The lower unit forms a pair of pivots on opposite sides of the pole. A springloaded tape cartridge is accommodated in the enclosure and includes a wheel, a gasket, and a gear. The first and second elastic members are respectively rotatably attached to the pivots of the lower unit. One end of each elastic member engages with the gear. The button is disposed at the notches of the enclosure. A pair of projections is formed on the button and presses opposite ends of the first and second elastic members respectively.

5 Claims, 4 Drawing Sheets

TAPE MEASURE WITH TAPE BRAKING MECHANISM

BACKGROUND OF THE INVENTION (a) Field of the Invention

The present invention relates to a tape measure, and particularly to a tape measure with an improved tape braking mechanism.

(b) Description of the Prior Art

Taiwan Patent issue No. 517839 discloses a tape measure which comprises an enclosure, a wheel, an operating member and a stopping plate. The enclosure comprises an upper unit and a lower unit each defining a notch, a guiding hole and a sliding slot. A tape winds around the wheel received in the enclosure. The operating member forms a releasing portion and a locking portion. The end of the locking portion forms an extension arm defining a locking slot. The stopping plate comprises a pair of pivots formed at opposite sides of the top end thereof. An elastic tab is formed at the stopping plate opposing the pivots. A protrusion is formed at an end of the tab.

In assembly, the operating member is movably attached to the enclosure. The locking portion and the releasing portion of the operating member are exposed at the notches of the enclosure. The stopping plate is received in the sliding slots of the enclosure and the elastic tab of the stopping plate abuts against one portion of the enclosure at the top side of the sliding slots. The pivots of the stopping plate are pivotably received in the holes of the enclosure to cause the top end of the stopping plate to be received in the locking slot of the operating member and the bottom end of the stopping plate to be adjacent to the tape. The tape can be pulled outside the enclosure or withdrawn in the enclosure via a user operating the operating member to drive the stopping plate to release the tape, and can be locked via the user operating the operating member to drive the stopping plate to lock the tape.

However, when the tape is locked or pulled outside the enclosure, the operating member drives the stopping plate to lock or release the tape. Friction is inevitably produced between the stopping plate and the tape, which results in abrasion of the tape and mistiness of the measurement indicia of the tape. Furthermore, the stopping plate is generally made of metal material and is prone to be abraded when used for a long time, which results in the stopping plate being incapable of locking the tape. Thus, an improved tape measure which overcomes the above problems is desired.

SUMMARY OF THE INVENTION

Accordingly, an object of the present invention is to provide a tape measure with an improved tape braking mechanism which can reduce abrasion of the tape.

To achieve the above-mentioned object, a tape measure in accordance with the present invention comprises an enclosure including an upper unit and a lower unit each forming a protrusion. Notches are respectively defined in the upper unit and the lower unit. Poles are respectively formed on the upper unit and the lower unit adjacent the notches. The upper unit forms a pair of latches on opposite sides of the notch. The lower unit forms a pair of pivots on opposite sides of the pole. A springloaded tape cartridge is accommodated in the enclosure and comprises a wheel, a gasket and a gear. The first and second elastic members are respectively rotatably attached to the pivots of the lower unit. One end of each of the elastic members engages with the gear. The button is attached to the enclosure and disposed at the notches thereof. A pair of projections is formed on the button and presses opposite ends of the first and second elastic members respectively.

Other objects, advantages and novel features of the present invention will be drawn from the following detailed description of a preferred embodiment of the present invention with attached drawings, in which:

DETAILED DESCRIPTION OF THE PREFERRED EMBODIMENTS

Figure 1:
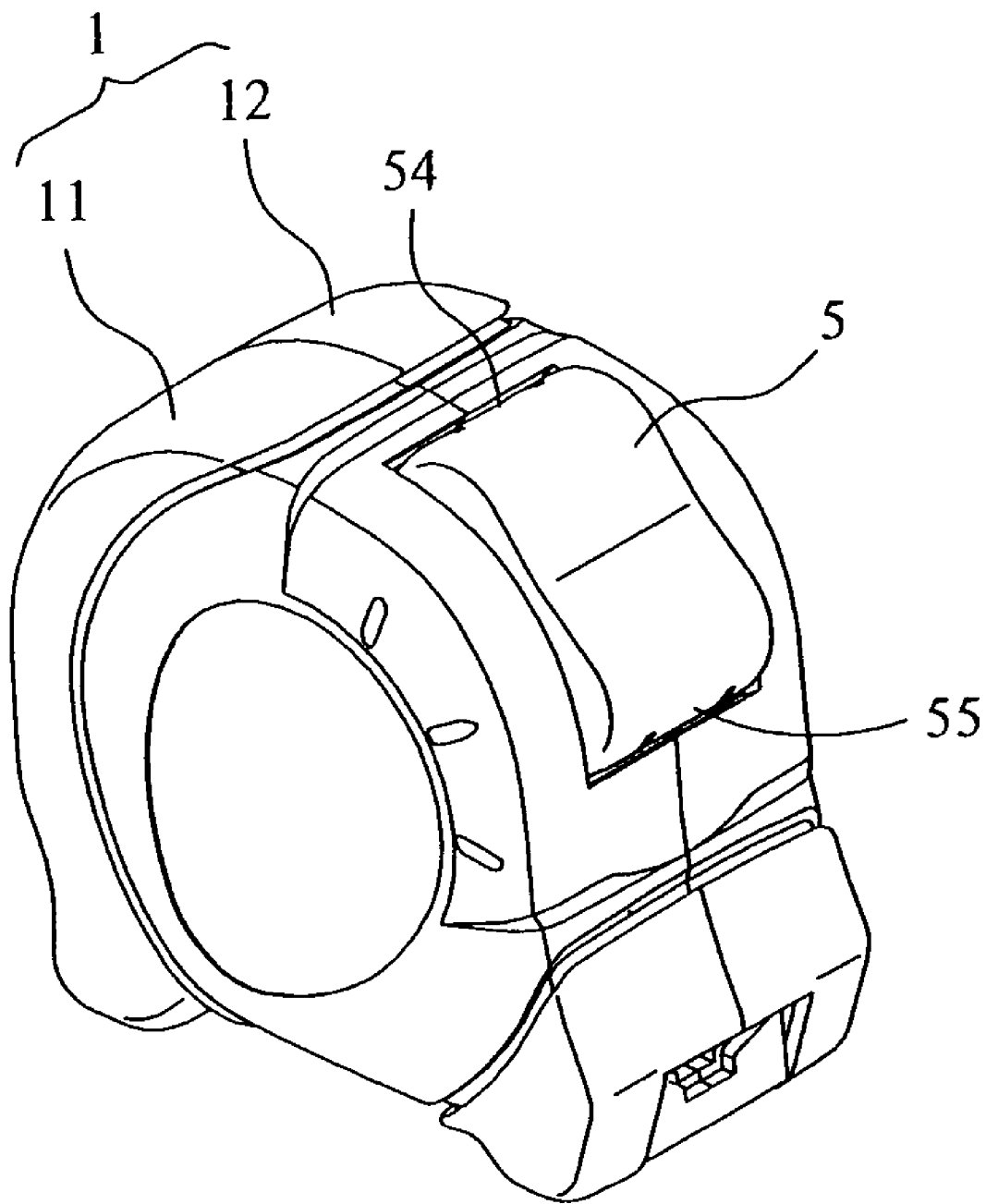
FIG. 1 is a perspective view of a tape measure in accordance with a preferred embodiment of the present invention.
Figure 2:
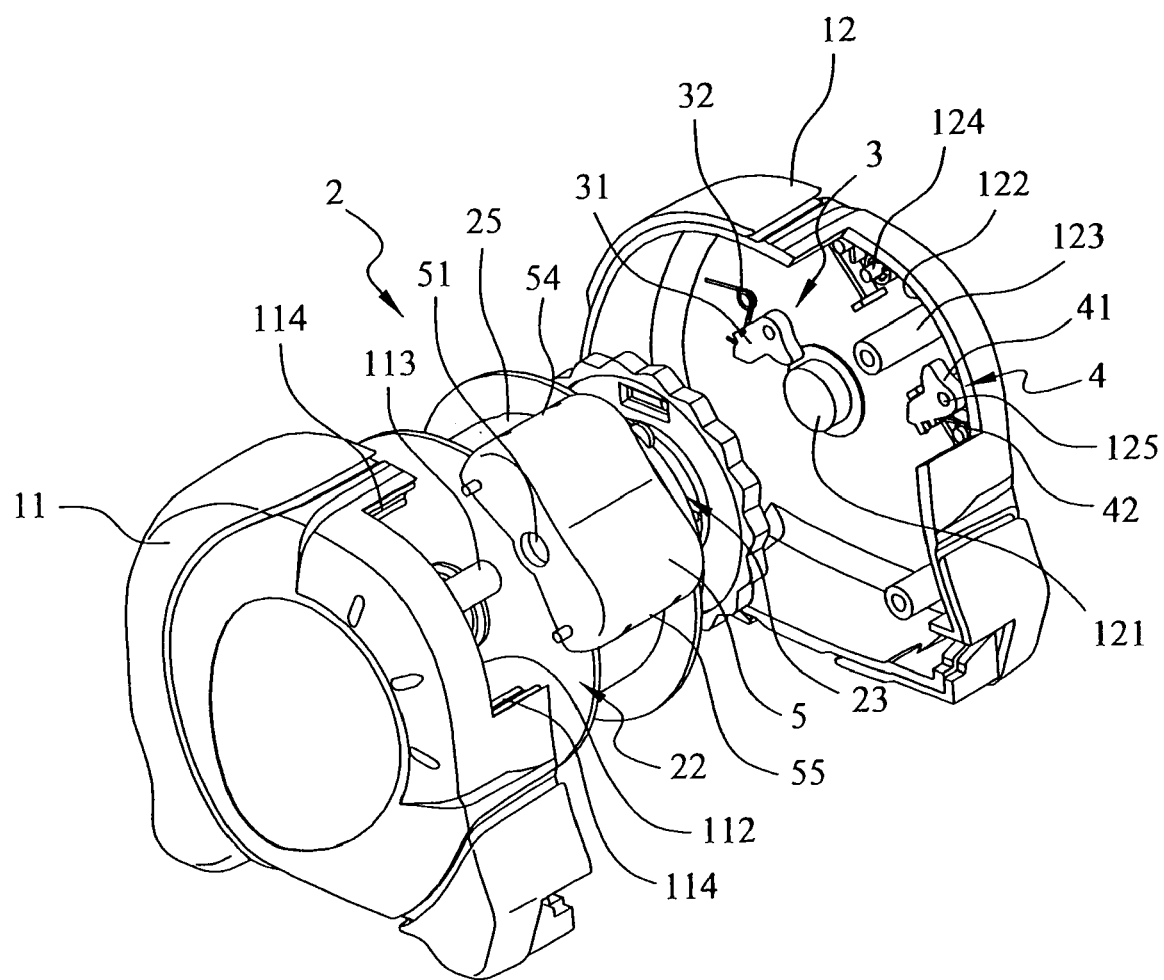
FIG. 2 is an exploded view of the tape measure of FIG. 1.
Figure 3:
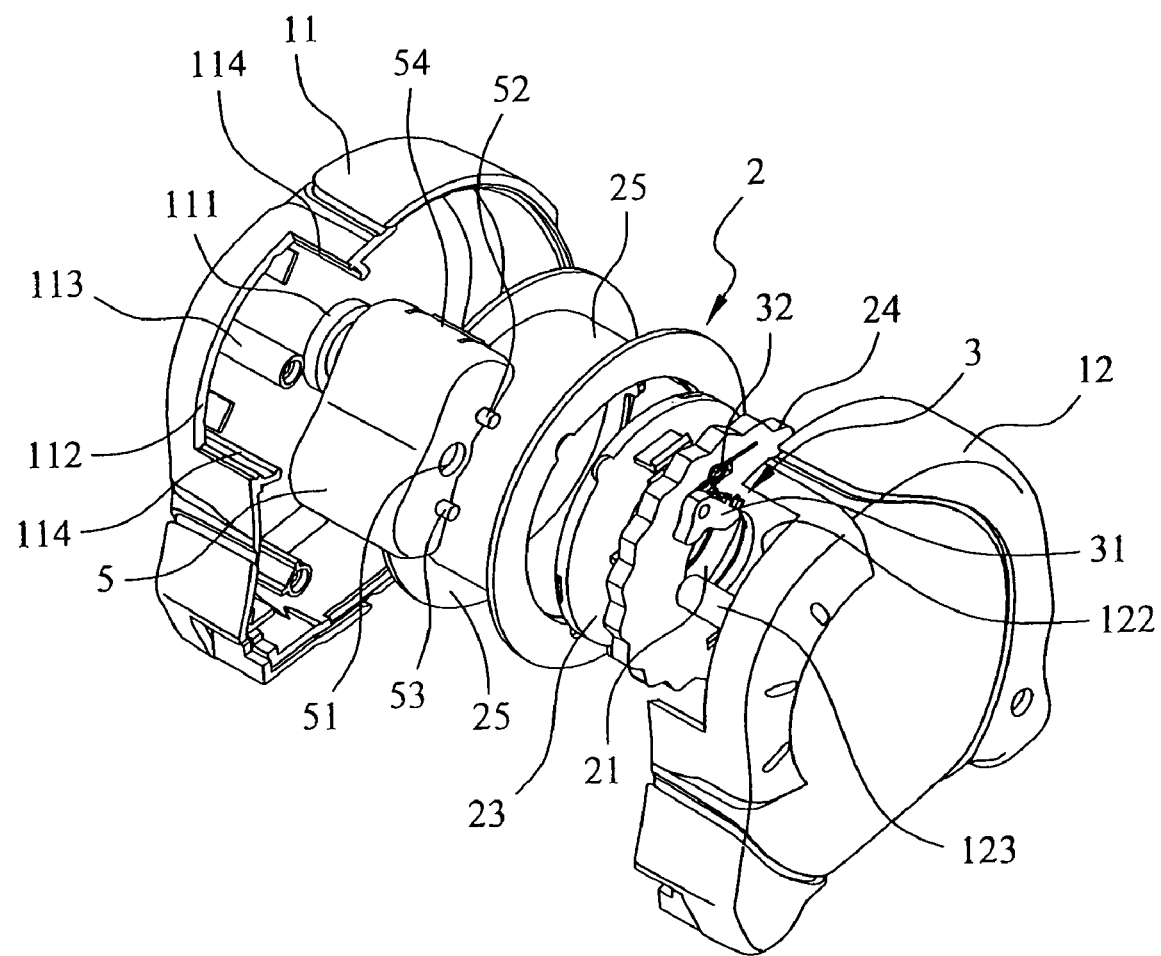
FIG. 3 is similar to FIG. 2 but viewed from another aspect.

Referring to FIGS. 1–3, a tape measure in accordance with a preferred embodiment of the present invention comprises an enclosure 1, a springloaded tape cartridge 2, and a tape braking mechanism which comprises a first elastic member 3, a second elastic member 4 and a button 5.

The enclosure 1 comprises an upper unit 11 and a lower unit 12 mating with each other. The upper unit 11 forms a protrusion 111 at a center thereof. The lower unit 12 forms a protrusion 121 corresponding to the protrusion 111 of the upper unit 11. Notches 112, 122 are respectively defined in the upper unit 11 and the lower unit 12. Poles 113, 123 are respectively formed on the upper unit 11 and the lower unit 12 adjacent the notches 112, 122. The upper unit 12 forms a pair of latches 114 on opposite sides of the notch 112. The lower unit 12 forms a pair of pivots 124, 125 on opposite sides of the pole 123.

The springloaded tape cartridge 2 is accommodated in the enclosure 1 and defines a through hole 21. The protrusions 111, 121 of the enclosure 1 are rotatably received in the through hole 21 of the springloaded tape cartridge 2 to thereby allow the springloaded tape cartridge 2 to rotate in the enclosure 1. The springloaded tape cartridge 2 comprises a wheel 22, a gasket 23 attached to one end of the wheel 22, and a gear 24 attached to the wheel 22. A tape 25 with measurement indicia coils around the wheel 22.

The first elastic member 3 is rotatably attached to the pivot 124 of the lower unit 12. The first elastic member 3 comprises a pressing part 31 and a spring 32. The pressing part 31 comprises a first end and a second end opposing the first end. The first end of the pressing part 31 engages with the gear 24 of the springloaded tape cartridge 2.

The second elastic member 4 is rotatably attached to the pivot 125 of the lower unit 12. The second elastic member 4 comprises a pressing part 41 and a spring 42. The pressing part 41 comprises a first end and a second end opposing the first end. The first end of the pressing part 41 engages with the gear 24 of the springloaded tape cartridge 2.

The button 5 is disposed at the notches 112, 122 of the enclosure 1. An aperture 51 is defined in the button 5 for receiving the poles 112, 123 of the enclosure 1 to thereby attach the button 5 to the enclosure 1. A pair of projections 52, 53 is formed on each of opposite sides of the button 5. The projections 52, 53 are for respectively pressing the second ends of the pressing parts 31, 32. A pair of elastic plates 54, 55 is formed in the button 5 corresponding to the latches 114 of the upper unit 11 of the enclosure 1.

Figure 4:
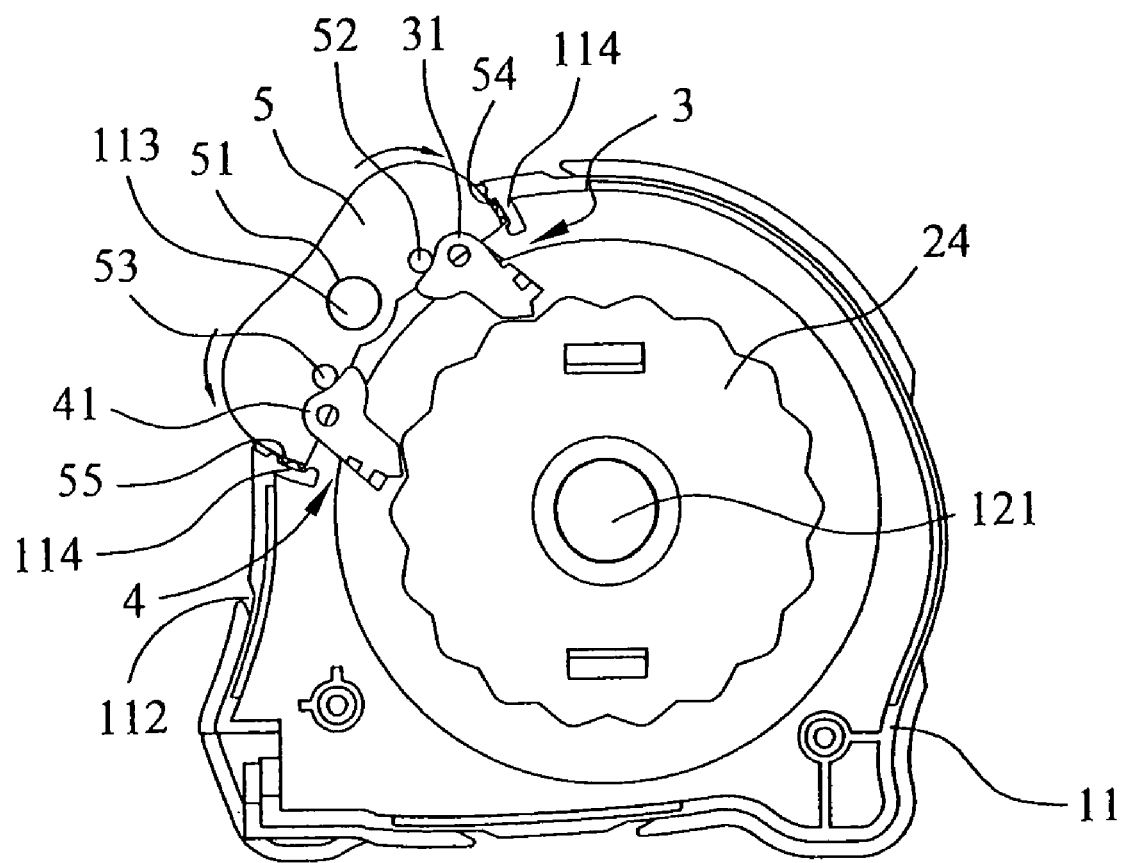
FIG. 4 is a sketch view showing operation of the tape measure.

Referring to FIG. 4, when a user wants to lock the tape 5, the button 5 is driven to locate at a middle position. The first ends of the pressing parts 31, 41 of the first and second elastic members 3, 4 both engage with the gear 24. The springloaded tape cartridge 2 is locked via the pressing parts 31, 41 engaging with the gear 24. The tape 5 is therefore locked.

When the user wants to pull the tape 5 out of the enclosure 1, the button 5 is pressed forward. The elastic plate 55 formed at the front portion of the button 5 is therefore engaged with the latch 114 of the upper unit 1 and the projection 53 of the button 5 downwardly presses the second end of the pressing part 41 of the second elastic member 4 to cause the first end of the pressing part 41 to move away from the gear 24. The second spring 42 of the second elastic member 4 is deformed. At that state, the user is capable of pulling the tape 5 out of the enclosure 1. In the process of the tape 5 being pulled out of the enclosure 1, the gear 24 impacts the pressing part 31 of the first elastic member 3. When the tape 5 is pulled to a predetermined position, the button 5 is moved to the middle position. At that state, the second spring 42 of the second elastic member 4 returns to its original state to thereby drive the second pressing part 41 to engage with the gear 24. So the gear 24 is locked.

When the user wants to withdraw the tape 5 into the enclosure 1, the button 5 is moved backward. The elastic plate 54 of the button 5 is engaged with the latch 114 of the upper unit 1 to retain the button 5 at the back position. The projection 52 of the button 5 presses the second end of the pressing part 31 of the first elastic member 3 to cause the first end of the pressing part 31 to disengage from the gear 24. The first spring 32 of the second elastic member 3 is deformed. The tape 5 is withdrawn in the enclosure 1 via a central spring (not shown) employed in connection with the tape cartridge 2 providing a retracting force tending to draw the tape back into the enclosure and rewind or re-coil it about the wheel 22. In the process of the tape 5 being withdrawn in the enclosure 1, the gear 24 impacts the pressing part 41 of the second elastic member 4. When the tape 5 is completely withdrawn in the enclosure 1, the button 5 is moved to the middle position. At that time, the first spring 32 of the first elastic member 3 returns to its original state to thereby drive the pressing part 31 to engage with gear 24. Therefore, the gear 24 is locked.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A tape measure comprising:
   an enclosure comprising an upper unit and a lower unit, the upper unit forming a protrusion thereon, notches being respectively defined in the upper unit and the lower unit, poles being respectively formed on the upper unit and the lower unit adjacent the notches, the upper unit forming a pair of latches on opposite sides of the notch, the lower unit forming a pair of pivots on opposite sides of the pole;
   a tape cartridge accommodated in the enclosure and defining a through hole rotatably receiving the protrusion of the upper unit to thereby attach the tape cartridge to the enclosure, the tape cartridge comprising a wheel, a gasket attached to the wheel, and a gear attached to the wheel;
   a first elastic member rotatably attached to the pivot of the lower unit, one end of the first elastic member engaging with the gear of the tape cartridge;
   a second elastic member rotatably attached to the pivot of the lower unit, one end of the second elastic member engaging with the gear of the tape cartridge; and
   a button being disposed at the notches of the enclosure and defining an aperture for receiving the poles of the enclosure, at least one face of the button forming a pair of projections for pressing opposite ends of the first and second elastic members respectively, a pair of elastic plates being formed in the button corresponding to the latches of the upper unit of the enclosure.

2. The tape measure as claimed in claim 1, wherein the lower unit of the enclosure forms a protrusion corresponding to the protrusion of the upper unit.

3. The tape measure as claimed in claim 1, further comprising a tape winding around the wheel.

4. The tape measure as claimed in claim 1, wherein the first elastic member comprises a pressing part and a spring.

5. The tape measure as claimed in claim 1, wherein the second elastic member comprises a pressing part and a spring.

\* \* \* \* \*